Jan. 3, 1950          A. Y. DODGE          2,493,232
COUPLING
Filed Sept. 8, 1945          2 Sheets-Sheet 2
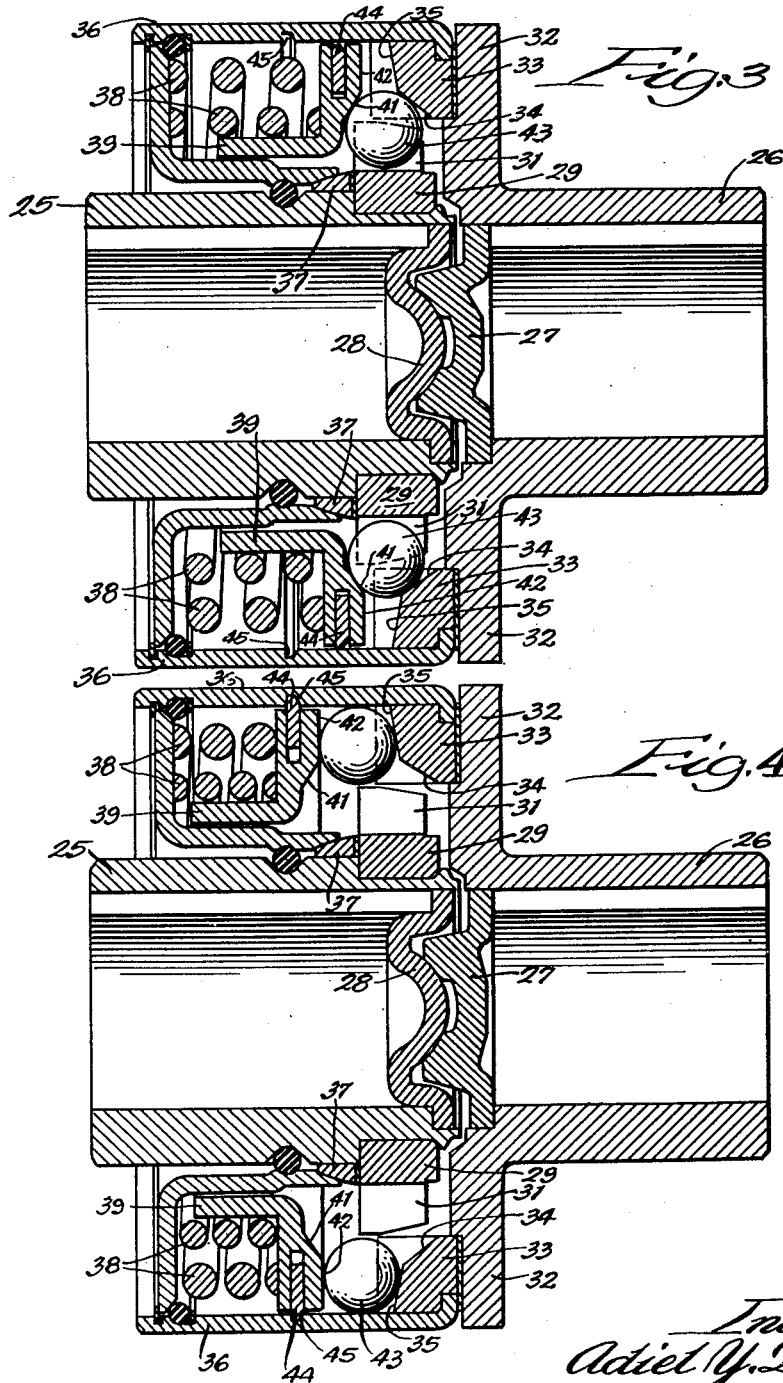

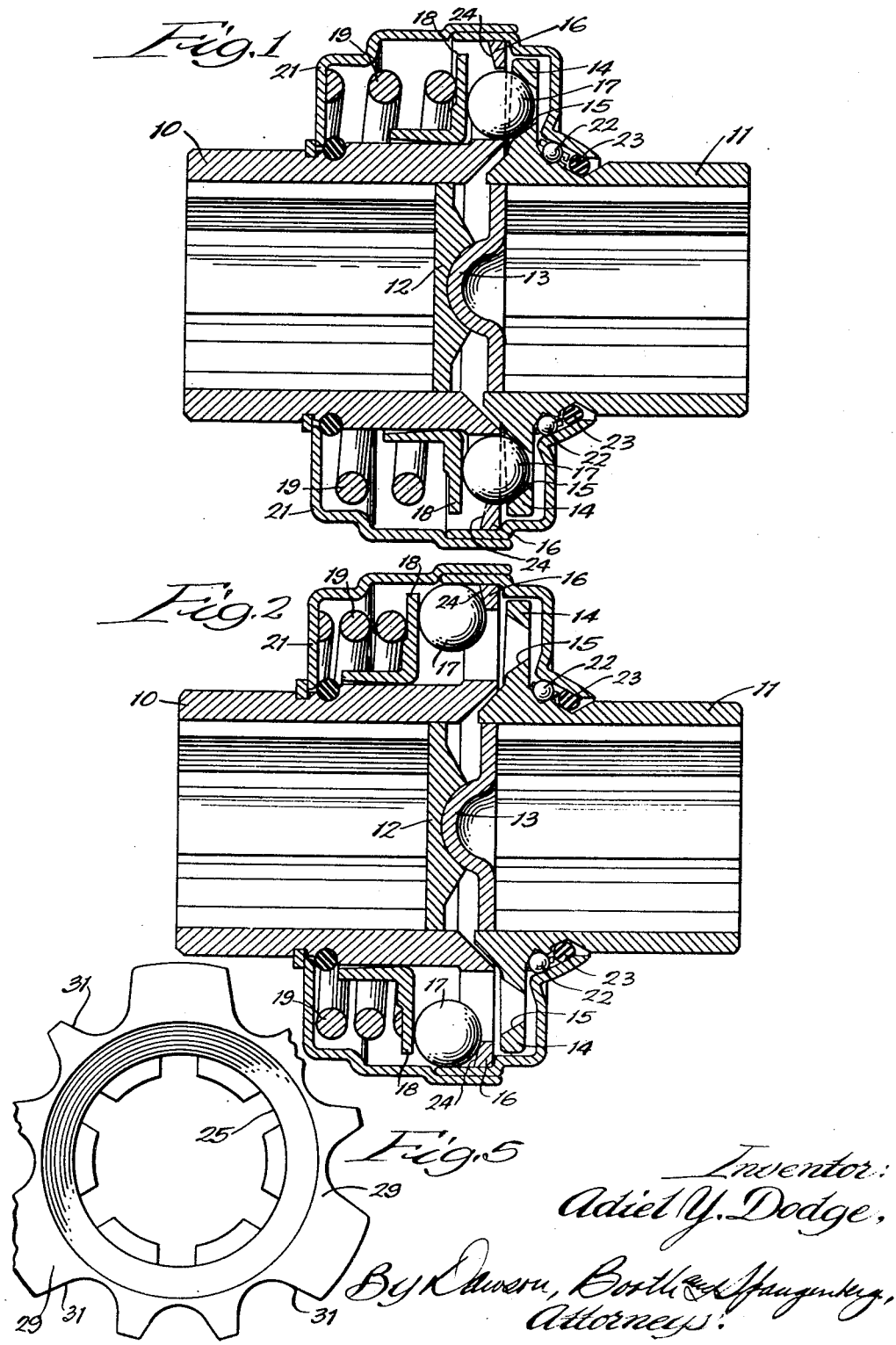

Patented Jan. 3, 1950

2,493,232

UNITED STATES PATENT OFFICE 2,493,232

COUPLING

Adiel Y. Dodge, Rockford, Ill.

Application September 8, 1945, Serial No. 615,231

14 Claims. (Cl. 192—104)

This invention relates to couplings and more particularly to torque transmitting couplings of the type adapted to release on overload.

One of the objects of the invention is to provide a coupling which is simple and inexpensive to manufacture and assemble and which comprises a minimum number of parts.

Another object is to provide a coupling which disengages in response to a predetermined torque load and which provides a minimum drag when disengaged. According to one feature of the invention, the coupling may be held disengaged by centrifugal force on the coupling parts so that no drag will occur.

Still another object is to provide a coupling in which the coupling members such as balls are urged toward engaged position with a relatively high degree of force when in connecting position and which engage relatively flat cam surfaces when in disconnecting position so that they will be urged toward engagement with a smaller degree of force.

The above and other objects and advantages of the invention will be more readily apparent from the following description when read in connection with the accompanying drawing, in which—

Figure 1 is a sectional view of one form of coupling embodying the invention in engaged position;

Figure 2 is a view similar to Figure 1 showing the parts in disengaged position;

Figures 3 and 4 are views similar to 1 and 2 respectively of an alternative form of coupling; and Figure 5 is a partial end elevation of the inner recessed coupling member of Figures 3 and 4.

The coupling shown in Figures 1 and 2 comprises a sleeve member 10 adapted to be splined to a driving shaft and a similar sleeve member 11 adapted to be splined to a driven shaft. While the member 10 is preferably connected to the driving shaft, it will be apparent that the member 11 could, if preferred, be the driving member. The sleeves 10 and 11 are connected at their abutting ends by a socket member 12 into which a partially spherical plug member 13 fits to prevent axial displacement of the members while permitting a limited degree of angular misalignment.

The driven member 11 is formed with an outwardly extending flange 14 having therein a series of conically tapered recesses or pockets 15 whose sides diverge. The member 10 is similarly formed with an outwardly extending flange 16 having openings therein adapted to register with the recesses or pockets 15. A series of balls 17 may slide through the openings in the flange 16 into engagement with the recesses or pockets 15 drivably to connect the members 10 and 11. The balls are urged into the recesses by a ring 18 slidable on the member 10 and urged toward the balls by a compression spring 19. The spring 19 is carried by a housing 21 connected to the sleeve 10 and having a skirt portion overlying the sleeve 11 and connected thereto by a thrust bearing 22 and a sealing ring 23.

With the parts in the position shown in Figure 1 the balls 17 extend through the openings in the flange 16 into the recesses or pockets 15 drivably to connect the members 10 and 11. Thus when either of the members 10 or 11 is driven, it will drive the other member through the balls.

As the torque imposed on the members increases, the sides of the recesses or pockets 15 will tend to cam the balls 17 to the left against the spring 19. When the torque load becomes sufficiently high the balls will be cammed back through the openings in the flange 16 and will tend to move outwardly to the position shown in Figure 2 in which the members 10 and 11 are free to rotate relatively to each other. When the balls start to move outward they will engage a cam surface 24 formed on the flange 16 at an acute angle to a radius so that the major part of the spring force will press the balls against the cam surface. It will be apparent that either or both the flange 16 and the ring 18 can be at an angle to a radius to produce a cam effect so that when the balls are in the outer position shown in Figure 2 they will be urged inwardly by the cam action with a relatively small degree of force. It will further be noted that with the coupling parts rotating, centrifugal force on the balls themselves tends to hold them out in the disengaged position so that when the speed is sufficiently high the clutch members may overrun with no drag at all due to the balls. By properly proportioning the cam angle and the spring, the effect of centrifugal force can be regulated so that the balls will reengage at any desired speed. When the speed drops low enough the balls will be cammed inwardly by the cam surface 24 and the pressure of the spring 19 thereon so that they will again engage the pockets 15 to reconnect the clutch members.

It will be seen that in this construction the balls are held in engaged position by direct action of the spring thereon so that the only moving parts required in addition to the spring are the balls themselves and the ring 18. Thus a very simple construction is provided which will operate positively and reliably to disconnect the coupling parts in response to a predetermined load and to maintain them disconnected until favorable torque and speed conditions are achieved.

In the construction of Figures 3 to 5 the coupling comprises a sleeve member 25 which may be connected to one shaft and a sleeve member 26 which may be connected to the other shaft. A socket member 27 is carried by one of the sleeves to receive a spherical projection 28 to prevent displacement of the sleeve axes when desired. In the coupling of Figures 3 to 5 a certain amount of axial displacement is permissible in which case the members 27 and 28 are omitted.

The member 25 carries adjacent its end a hardened ring 29 formed on its exterior with a series of notches, as seen at 31 in Figure 5, having diverging sides. It will be understood that the notches could be formed directly in the sleeve member 25 but a separate ring, as shown, is preferable to reduce the amount of hardened steel which must be used and to facilitate replacement in case of wear. The sleeve member 26 is formed with a flange 32 carrying a cam ring 33 which may be hardened. The ring 33 is formed with a series of notches terminating in inner cam surfaces 34 and outer cam surfaces 35 forming different angles to a radius through them. As shown, the cam surface 34 is at a greater angle to a radius through it than the cam surface 35 for a purpose to appear later. The flange 32 also carries a housing 36 which encircles the sleeve member 25 and which may, if desired, be connected thereto through a spherical pilot bearing 37. The housing 36 encloses compression springs 38 acting on a presser ring 39 to urge it toward the ring 33. As shown, the presser ring is formed at its outer end with a cam surface 41 lying at an acute angle to a radius through it and radially outward of the surface 41 with a substantially radial cam surface 42.

The members are adapted to be connected by a series of spherical balls 43 engaging the presser ring 39 and the cam ring 33 and adapted to be moved thereby into engagement with the notches 31 in the ring 29. Due to the curvature of the balls, their surfaces provide cam surfaces lying at different angles to radii through the balls and different portions of which engage the respective cam surfaces 34, 35, 41 and 42 as the balls move. When the coupling is engaged, the parts occupy the position shown in Figure 3 in which the outer portions of the cam surfaces of the balls engage the cam surfaces 41 and 34 so that they will be moved radially inward into engagement with the notches by a relatively high force. As the torque increases, the sides of the notches 31 tend to cam the balls outward and at a predetermined torque load which is fixed by the strength of the springs and the cam angles the balls will move out to the position shown in Figure 4. As soon as the balls start to move out, they engage the relatively flat cam surface 35 of the notches and the substantially radial surface 42 of the presser ring at points on the ball surfaces close to a diameter parallel to the coupling axis so that they will be urged inward with a relatively small force. It will further be noted that centrifugal force on the balls tends to hold them out in the position shown in Figure 4 so that the clutch parts can overrun with no drag. When the speed of the clutch parts is sufficiently reduced, the balls will be moved inward by the action of the cam surface 35 to reengage the notches 31 and reconnect the coupling members.

When it is desired to reduce to a minimum the speed at which the coupling parts will re-engage, centrifugal locking means may be provided to hold them out of engagement against the spring until a very low speed has been reached. As shown in Figures 3 and 4, the locking means comprises toothed segments 44 slidably carried by the presser ring 39 and freely movable outward in response to centrifugal force thereon. When the clutch parts are engaged, as shown in Figure 3, segments 44 contact the inner surface of the housing 36 and are held inward thereby in the position shown. When the coupling parts are disengaged, as shown in Figure 4, the toothed segments 44 will move out in response to centrifugal force into the groove 45 in the housing 36. In this position the segments act as latches, tending to hold the presser ring in its retracted position so that the springs 38 will exert very little force on the coupling balls 43 to urge them toward engagement. Preferably, the groove 45 and the ends of the segments 44 are slightly tapered, as shown, so that the force of the springs thereon will produce a camming action tending to move the segments inward. By properly proportioning the cam angle of the groove and segments relative to the weight of the segments, the speed at which the coupling will re-engage can be accurately determined.

It will be understood that the notches or recesses in both forms of the invention shown may be spaced in any desired manner so that the coupling parts can engage in one or more positions of relative rotation. As shown in Figure 5, the notches 31 are arranged in groups of three and the notches in the ring 33 are similarly spaced so that engagement may occur in any one of three relative positions of the coupling members. In all other positions, at least one of the balls will engage the outermost part of the ring 29 between the notches so that the balls will be held out. Instead of providing three groups of three notches, as shown, it will be understood that any desired spacing could be employed to provide any desired number of engaged positions.

While one embodiment of the invention has been shown and described in detail herein, it will be understood that this is illustrative only and is not intended as a definition of the scope of the invention, reference being had for this purpose to the appended claims.

What is claimed is:

1. A coupling comprising rotatable driving and driven members, one of the members being formed with recesses therein having diverging sides, coupling elements movably carried by the other member adapted to enter the recesses to connect the members, a spring acting on the coupling elements to urge them into the recesses, and means on the other member forming a cam surface lying at an obtuse angle to the line of action of the spring and engageable with the coupling elements when they are out of engagement with the recesses.

2. A coupling comprising rotatable driving and driven members, one of the members being formed with recesses therein having diverging sides, coupling elements movably carried by the other member adapted to enter the recesses to connect the members, a ring slidable on the other member and engageable with the coupling elements to urge them into the recesses, a spring urging the ring toward the coupling elements, and means on said other member providing a surface converging outward at an acute angle to the surface of the ring, the coupling elements lying between said surface and the ring when they are out of engagement with the recesses.

3. A coupling comprising rotatable driving and driven members, one of the members being formed with a series of recesses having diverging sides, a series of balls movably carried by the other member adapted to enter the recesses to connect the members, a ring slidable on the other member and engageable with the balls to urge them into the recesses, a spring urging the ring toward the balls, and means on said other member providing a cam surface lying radially outward of the recesses and converging outward at an acute angle to the ring.

4. A coupling comprising rotatable driving and driven members, a substantially radial flange on one of the members formed with a series of axially facing recesses, a substantially radial flange on the other member formed with a series of openings adapted to register with the recesses, balls slidable through the openings to engage the recesses, and a spring carried by the other member to urge the balls into the recesses, the flange on the other member radially beyond the openings forming a cam surface lying at an acute angle to a radius therethrough to engage the balls when they are out of engagement with the recesses.

5. A coupling comprising rotatable driving and driven members, a substantially radial flange on one of the members formed with a series of axially facing recesses, a substantially radial flange on the other member formed with a series of openings adapted to register with the recesses, balls slidable through the openings to engage the recesses, a ring slidably carried by the other member and engageable with the balls to urge them into the recesses, and a spring carried by the other member urging the ring toward the balls, the flange on the other member radially beyond the openings forming a cam surface converging outwardly at an acute angle to the ring.

6. A coupling comprising rotatable driving and driven members, a substantially radial flange on one of the members formed with a series of axially facing recesses, a substantially radial flange on the other member formed with a series of openings adapted to register with the recesses, balls slidable through the openings to engage the recesses, a ring slidable on said other member and terminating in a plane radial surface engageable with the balls to urge them into the recesses, and a spring urging the ring toward the balls, the flange on the other member radially beyond the openings sloping outwardly toward the ring to form a cam surface to engage the balls when they are out of engagement with the recesses.

7. A coupling comprising rotatable driving and driven members, means on one of the members forming an outwardly facing series of recesses, an annular block on the other member radially beyond the recesses and formed on one side with inner and outer cam surfaces lying at different angles to the axis of said other member, a plurality of coupling elements engageable with the cam surfaces to be cammed thereby toward the recesses with different degrees of force in different positions, and means including a spring carried by said other member urging the coupling elements toward the block.

8. A coupling comprising rotatable driving and driven members, means on one of the members forming an outwardly facing series of recesses, an annular block on the other member radially beyond the recesses and formed on one side with a series of notches terminating at their bottoms in inner and outer connected cam surfaces lying at different angles to the axis of said other member, a series of coupling elements fitting into the notches to be cammed toward the recesses with different degrees of force by the cam surfaces, and means including a spring urging the coupling elements toward the cam surfaces.

9. A coupling comprising rotatable driving and driven members, means on one of the members forming an outwardly facing series of recesses, an annular block on the other member radially beyond the recesses and formed on one side with a series of notches terminating at their bottoms in inner and outer connected cam surfaces lying at different angles to the axis of said other member, a series of coupling elements fitting into the notches to be cammed toward the recesses with different degrees of force by the cam surfaces, a ring slidable on the other member and engageable with the coupling elements, and a spring urging the ring toward the notches.

10. A coupling comprising rotatable driving and driven members, means on one of the members forming an outwardly facing series of recesses, an annular block on the other member radially beyond the recesses and formed on one side with a series of notches terminating at their bottoms in inner and outer connected cam surfaces lying at different angles to the axis of said other member, a series of balls fitting into the notches to be cammed toward the recesses with different degrees of force by the cam surfaces, a ring slidable on the other member and engageable with the balls, a spring urging the ring toward the notches, the ring having an inner cam surface lying at an acute angle to the axis of the members to urge the balls toward the recesses and an outer substantially radial surface engageable with the balls when they are out of the recesses.

11. A coupling comprising rotatable driving and driven members, coupling elements movably carried by one of the members engageable with the other member, the coupling elements and the other member being so constructed and arranged that the coupling elements will move out of engagement with the other member in response to a predetermined torque, a ring movable axially of said one member and engageable with the coupling elements to urge them into engagement with the other member, a spring urging the ring toward the coupling elements, a housing inclosing the spring and ring, and latch members carried by the ring movable radially outward thereon in response to centrifugal force, the housing being formed with means to engage the latch members when the ring is in retracted position with the coupling elements disengaged.

12. A coupling comprising rotatable driving and driven members, one of the members being formed with recesses having diverging sides, balls movably carried by the other member adapted to enter the recesses to connect the members, a ring slidable axially on the other member to engage the balls and urge them into the recesses, a spring urging the ring toward the balls, a housing inclosing the spring and ring, and latch means including a groove in the housing and latch members carried by the ring to move into the groove in response to centrifugal force when the ring is retracted and the balls are out of engagement with the recesses.

13. A coupling comprising rotatable driving and driven members, one of the members being formed with recesses therein having diverging sides, coupling elements movably carried by the other member adapted to enter the recesses to connect the members, a ring engaging the coupling elements to urge them into the recesses, a spring urging the ring toward the coupling elements, the ring and the coupling elements having interengaging cam surfaces lying at different angles relative to the line of action of the spring and different angular portions of which engage when the ring and coupling elements are in different positions to urge the coupling elements toward the recesses with different degrees of force.

14. A coupling comprising rotatable driving and driven members, means on one of the members forming an outwardly facing series of recesses, an annular block on the other member lying radially beyond the recesses, a plurality of coupling elements carried by the annular block and guided thereby for movement into and out of engagement with the recesses, an axially movable ring on the other member having inner and outer cam surfaces engageable with the coupling elements and lying at different angles to the axis of said other member to cam the coupling elements toward the recesses with different degrees of force in different positions, and means carried by said other member to urge the ring toward the coupling elements.

ADIEL Y. DODGE.

REFERENCES CITED

The following references are of record in the file of this patent:

UNITED STATES PATENTS

| Number | Name | Date |
| --- | --- | --- |
| 998,615 | Huneke | July 25, 1911 |
| 1,105,408 | Dechamps | July 28, 1914 |
| 1,579,057 | Asbury | Mar. 30, 1926 |
| 1,805,692 | Ferenci | May 17, 1931 |
| 1,883,164 | Vassakos | Oct. 18, 1932 |
| 2,401,992 | Waller | June 11, 1946 |